April 9, 1968     S. G. BAIR     3,376,979
PLEATED FILTER
Filed Oct. 4, 1965
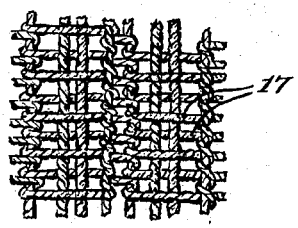
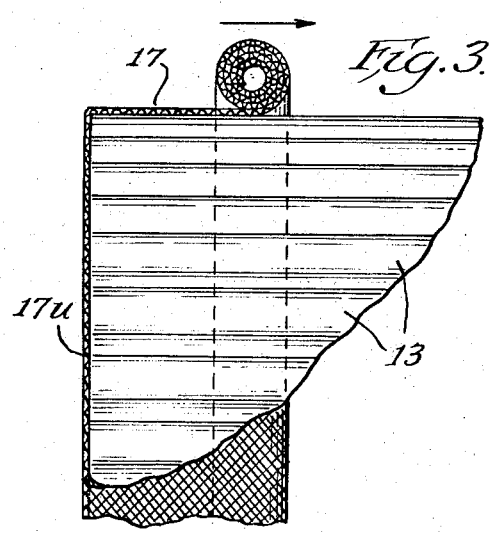
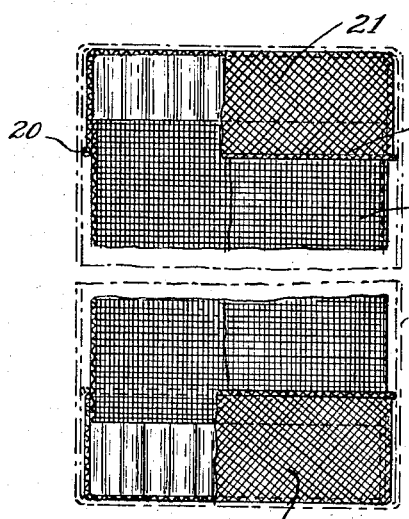
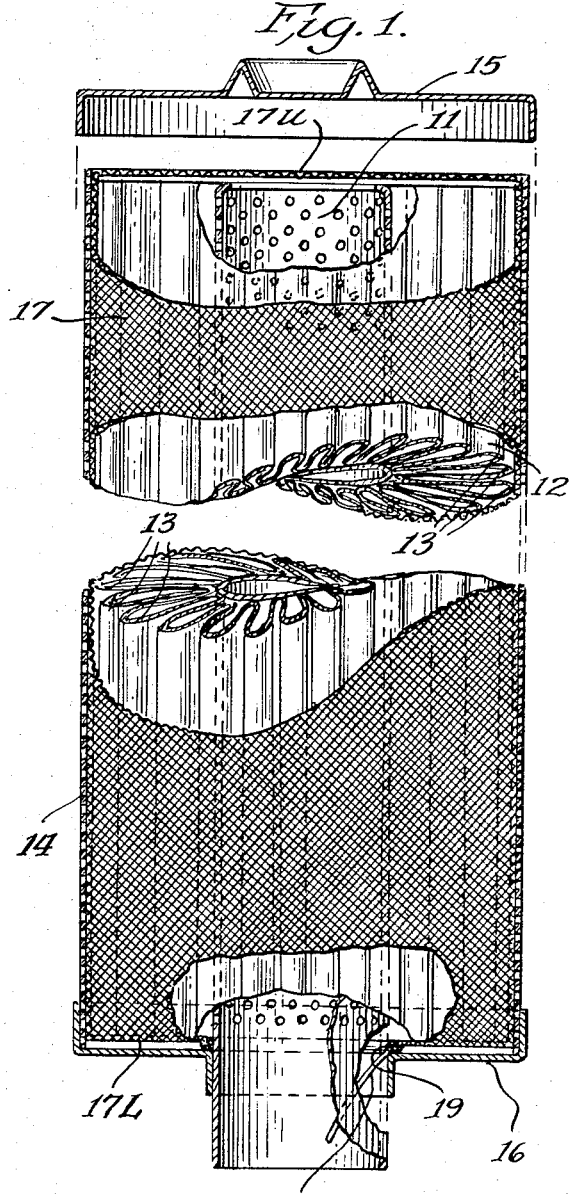
Inventor
Stanley G. Bair
By Dressler, Goldsmith, Clement, Gordon & Ladd.
Attys.

United States Patent Office 3,376,979
Patented Apr. 9, 1968

3,376,979
PLEATED FILTER
Stanley G. Bair, Chicago, Ill., assignor to Allied Filter
Engineering, Inc., a corporation of Illinois
Filed Oct. 4, 1965, Ser. No. 492,735
2 Claims. (Cl. 210—457)

ABSTRACT OF THE DISCLOSURE

A locomotive lubrication filter having a perforated tubular core encircled by an elongated permeable pleated paper filter that presents a series of circumferentially distributed pleats extending in side by side relation substantially coextensive with the tube. A woven sock structure having a diameter in its relaxed configuration of less than ½ the diameter of the filter element is mounted in an expanded stretched condition about the filter element and lies in taut contact against the outer extremities of the pleats to constrain the pleats in normally spaced array and prevent collapse or caking of one pleat against another. The sock is of cotton waste material to cooperate with the paper filter element and provide a dual filter action. The sock is a one piece element having a closed end and is applied full length over the pleats or, a pair of stub socks are applied over opposite ends of the filter element which has a netting encircling its intermediate region and fixed to the pleats therealong.

---

This invention relates to pleated filters and more particularly to filters of the pleated paper type wherein each of the pleats exhibits an inherent resilient flexibility.

An important application for pleated paper filters exists in the high pressure lubrication systems of railway diesel locomotives. Locomotive lubrication filters encounter extreme operating conditions including high system pressures and flows and severe startup surges. In addition the running temperatures are high and a wide variety of contaminant particle sizes must be removed.

Filters for such applications should exhibit a maximum of flowthrough capacity per unit volume; should maintain a maximum exposed effective filter area; should prevent permanent pleat collapse; and should be capable of filtering a wide range of particle sizes including particularly particle sizes as small as 5 microns.

Pleated paper is commonly used in these filters and may readily be provided with pore sizes of 20 micron or somewhat less, but filters of this construction have pleats which exhibit an inherent resilient flexibility so that they are subject to individual collapse in the presence of unbalanced system flows and surges.

The present invention provides a filter structure of the pleated paper type enveloped by a woven sock that is disposed in taut contact against the outer extremities of the pleats to constrain the pleats in normal spatial array. The woven sock has a diameter when relaxed of less than half the diameter of the filter element and it is expandable to facilitate entry of the sock endwise over the filter element, the expansion serving to stretch the woven sock to a taut condition effective to constrain the pleats against collapse and caking one against the other.

To provide a dual filter action the woven sock is chosen of cotton waste material, the fibers of which serve to trap particles as small as 5 microns for preventing such particles from clogging the pore structure of the paper element. The sock may be applied as a one-piece element directly over a pleated paper array or may be applied as a two-piece element assembled over opposite ends of the array. In each of these instances the sock may be loose but taut upon the pleats or may be secured by adhesive directly to the pleats to connect them in a positive mechanically ganged relationship.

Other features and advantages of the invention will be apparent from the following description and claims and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same:

FIG. 1 is an exploded side elevational view of a filter constructed in accordance with this invention, with various portions of the filter broken out and sectioned to facilitate disclosure;

FIG. 2 is a greatly enlarged fragmentary view illustrating a portion of a woven sock structure employed in the filter of FIG. 1, the sock being represented in a stretched condition;

FIG. 3 is a reduced fragmentary diagrammatic view illustrating the application of the sock to the pleated filter element during assembly; and FIG. 4 is a fragmentary side elevational view of another embodiment of filter utilizing a two-piece sock structure.

Referring now to the drawings the invention, as disclosed herein, is illustrated in connection with generally cylindrical pleated paper filter elements such as are used in the engine lubrication systems of diesel locomotives. In FIG. 1 a filter arrangement utilizing a one-piece sock structure is shown and in FIG. 4 a filter arrangement utilizing a two-piece sock structure is shown.

The filter embodiment illustrated in the exploded view of FIG. 1 includes a perforated cylindrical tube 11 serving as a core and an elongated permeable pleated paper filter section 12 disposed in a generally cylindrical annular array closely encircling the core 11 and characterized by a series of circumferentially distributed pleats 13 extending in side by side relation substantially coextensive with the core. An outer cover wrap 14 loosely encircles the pleated filter element 12 in close fit relation and usually extends the full length of the pleats to seat in upper and lower end caps 15 and 16, respectively. Each of these end caps spans the full diameter of the filter to contact and seal against the corresponding ends of the core 11 and pleats 13 in the usual fashion.

The filter element 12 may have its pleats 13 free and independent of each other or may be of the type shown in copending application Ser. No. 448,427, filed Apr. 15, 1965, wherein a netting is bonded to the outer extremities of the pleats to connect them in a mechanically ganged relationship.

In accordance with the present invention a woven sock structure 17 embraces the outer extremities of the pleats of either type of filter element along a substantial region of its length. The sock structure 17 has a normal relaxed configuration of much less diameter than the filter element, for example, less than one half. Thus the sock is expanded to a stretched condition about the filter element 12 to be disposed in taut contact against the outer extremities of the pleats and constrain the pleats 13 in normal spaced array.

The filter embodiment shown in FIG. 1 incorporates a woven sock structure 17 of one-piece which is shown extending completely along the length of the filter element 12 and overlapping end edges of the pleats 13. As pictured, the upper end 17U of the sock is closed and lies closely adjacent the end of the filter element while the lower end 17L of the sock overlies the pleat ends and is open centrally to accommodate the core 11. The open lower end 17L of the sock is shown with a beaded or hemmed edge 19 equipped with a draw string 20 for contracting it. A fragment of the stretched configuration of the woven sock structure is illustrated in FIG. 2, and it will be understood that while the sock material is in a substantially taut configuration, it is capable of somewhat further expansion so that it establishes an effective engagement against the extremities of the pleats without, however, causing damage to the filter paper.

The woven sock 17 is fabricated of a waste cotton thread material which exhibits a filtering action capable of trapping particles of about 5 microns and the sock structure preferably extends the entire length of the filter to achieve the maximum of this dual filter effect. Moreover, the mounting and securement of the sock is more easily handled when it extends the entire length of the filter element and overlies at the ends.

In the practice of the present invention the filter section 12 is formed from a flat sheet of paper filter media which is pleated in any desired manner to present a planar array of pleats. The filter element is then cut to length and ultimately formed into an annular array encircling the core 11, with adjacent edges of the pleats being secured to stabilize the assembly of the pleats about the core. The woven sock structure 17 is then applied about the cylindrical filter element, as illustrated in FIG. 3, by gathering the main length of the sock into a rolled foreshortened configuration which is then stretched in diameter and pulled endwise onto the filter element to envelop the upper end of the filter element. The sock is progressively unrolled along the length of the pleats so that it tautly embraces and engages the pleats to constrain them in their normal spaced array. Thereafter the outer cover wrap 14 is applied and the end caps 15 and 16 are seated over the edges of the cover wrap to complete the filter.

While the sock structure 17 may be applied loose, the invention also contemplates fixing the same to the outer extremities of the pleats by adhesive. In particular, in the manufacture of such a structure, a heat activable type adhesive is applied to the outer extremities of the pleats 13 prior to gathering and rolling the sock into place, and thereafter heat is applied to activate the adhesive and bond the sock to the pleat extremities. The heating step may be performed by passing each filter element, with the adhesive and sock in place, through a heat tunnel so that the adhesive is activated and the solvent completely flashed off to prevent reactivation of the adhesive when the filter is later subjected to high temperature oil used in diesel railway lubrications systems.

Another embodiment employing a woven sock structure in accordance with this invention is illustrated in FIG. 4, wherein the filter element is shown as being of the type illustrated in FIGS. 1–4 of the aforesaid application. Thus the filter section 12 has an annular array of pleats 13 to define an axial central passage and the filter includes a netting 18 spanning its intermediate length region and terminating in spaced relation to the ends of the pleats, there being securing means fixing the netting to the outer extremities of the pleats. Woven sock stubs 21 and 22, respectively, are shown applied over the top and bottom ends of the filter element to span the exposed pleat regions and overlap somewhat with the corresponding end of the netting. Each of the woven sock stubs overlies the corresponding filter end and has its open end stationarily positioned to overlap the netting 18 by means of a hem 19 and draw string 20 or by means of adhesive applied to the pleat peaks. In the embodiment of FIG. 4 the stub socks 21 and 22 together with the netting 18 provide a dual filter action. As is conventional, filtering flow is radial through the pleats 13 and through the axial central passage to exit through one of the sock stubs.

Knit tubing socks woven to the following specifications are given as typical structures for use in the practice of this invention.

(A) Knit tubing having a flat width of 2⅝" and a stretch width of 10½" woven of a yarn having 10/1 karded cotton count 1¼" U.S.A.D.A., graded staple cotton. The knitting basis being:

(1) 3¾" diameter cylinder, 3×1 rib, with automatic tension control.
(2) 48 gauge 80 cylinder needles, 120 dial needles, 200 wales.

(B) Knit tubing having a flat width of 2⅜" and a stretch width of 10½" woven of a yarn having 10/1 karded cotton count 1¼" U.S.A.D.A., graded staple cotton. The knitting basis being:

(1) 3¾" diameter cylinder, full rib, with automatic tension control.
(2) 48 gauge 82 cylinder needles, 82 dial needles, 164 wales.

(C) Knit tubing having a flat width of 2¾" and a stretch width of 10" woven of a yarn having ⅕₅ type 75 Orlon U.S.A.D.A., 100% Orlon. The knitting basis being:

(1) 3¾" diameter cylinder, full rib, with automatic tension control.
(2) 48 gauge 82 cylinder needles, 82 dial needles, 164 wales.

(D) Knit tubing having a flat width of 2½" and a stretch width of 9½" woven of a yarn having 10/1 polypropylene U.S.A.D.A., olefin 100% spun. The knitting basis being:

(1) 3¾" diameter cylinder, full rib, with automatic tension control.
(2) 48 gauge 82 cylinder needles, 82 dial needles, 164 wales.

Thus, while preferred constructional features of the invention are embodied in the structure illustrated herein, it is to be understood that changes and variations may be made by those skilled in the art without departing from the spirit and scope of the appended claims.

What is claimed is:

1. In a filter, an elongated generally cylindrical permeable filter element defining an axial central passage and providing a lengthwise extending annular array of normally stable pleats surrounding said passage, a perforate cylindrical core within the central passage, each pleat being resiliently flexible in a direction generally circumferential of the filter element, tension transmitting flexible netting circumferentially encircling an intermediate length region of said filter element in widely distributed, multiple point, intersecting contact with outer extremities of said pleats, securing means fixing said netting to the outer extremities of the pleats, and a separate woven sock stub of waste cotton material circumferentially encircling each end of the filter element, each sock stub having a relaxed diameter only fractionally as great as the diameter of the filter element to be disposed in taut enveloping contact against the outer extremities of the pleats between the end of the netting and the corresponding end of the filter element, at least one end of said passage having fluid communication through one of said stubs.

2. In a filter in accordance with claim 1 wherein each of said sock stubs has a relaxed diameter less than half the diameter of the filter element.

(References on following page)

References Cited

UNITED STATES PATENTS

| | | | |
|---|---|---|---|
| 2,988,227 | 6/1961 | Harms | 210—493 |
| 3,076,553 | 2/1963 | Yelinek | 210—484 X |
| 3,189,179 | 6/1965 | McMichael | 210—493 X |
| 3,241,680 | 3/1966 | Humbert | 210—484 |

FOREIGN PATENTS

| | | |
|---|---|---|
| 552,386 | 5/1957 | Belgium. |
| 628,813 | 10/1961 | Canada. |

SAMIH N. ZAHARNA, *Primary Examiner.*

REUBEN FRIEDMAN, *Examiner.*

C. DITLOW, *Assistant Examiner.*